June 23, 1931.  C. I. WALKER  1,811,525
GLARE SHIELD FOR EYELENSES
Filed July 31, 1928
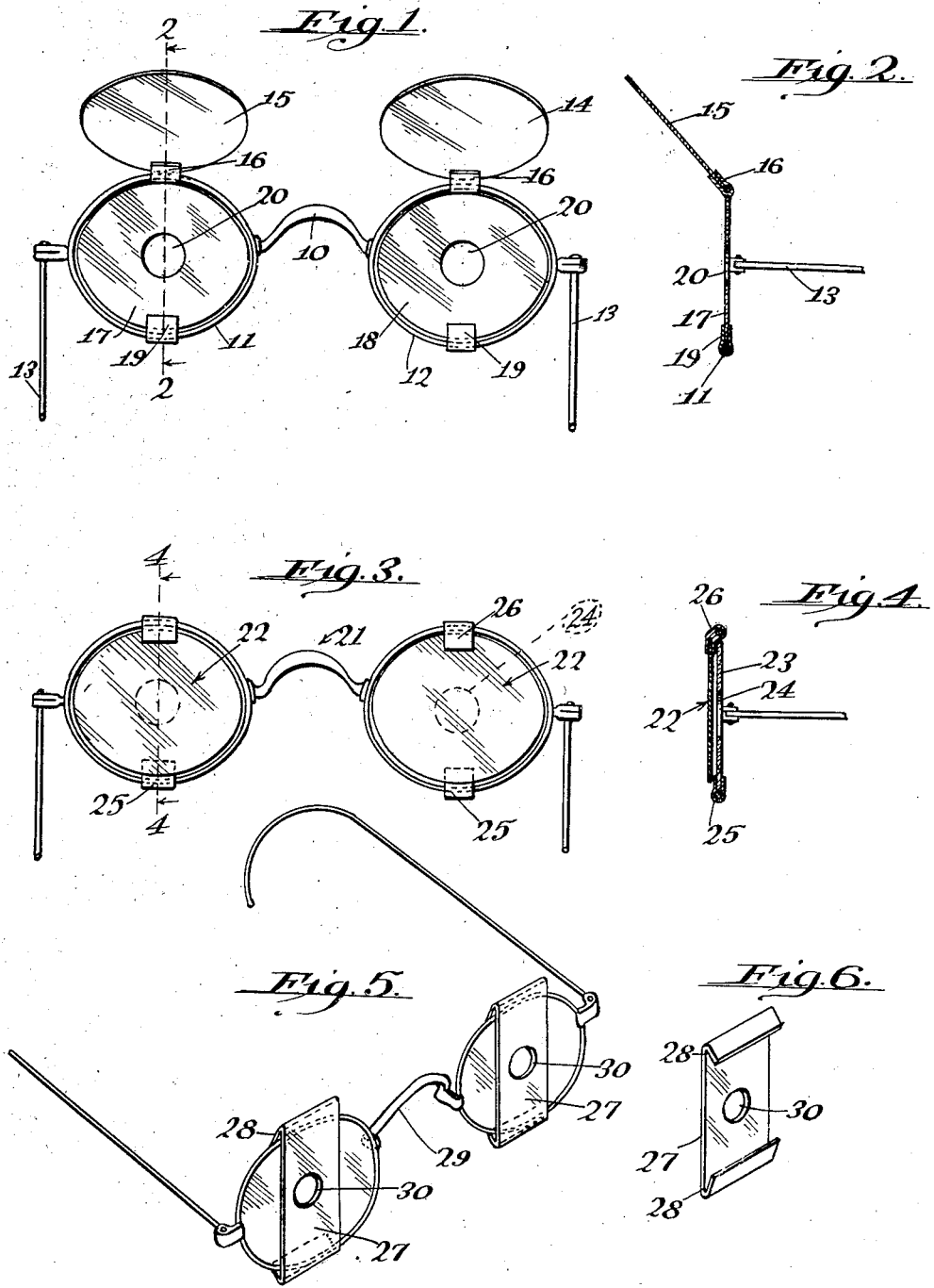
Inventor:
Charles I. Walker
by Hazard and Miller
Attorneys.

Patented June 23, 1931

1,811,525

UNITED STATES PATENT OFFICE

CHARLES I. WALKER, OF LOS ANGELES, CALIFORNIA

GLARE SHIELD FOR EYELENSES

Application filed July 31, 1928. Serial No. 296,511.

This invention relates to improvements in glare shields which are adapted to be worn by persons under glaring conditions.

An object of the invention is to provide an improved glare shield having lenses formed of semi-transparent material in which lenses there are formed relatively small apertures, so that the wearer of the glare shield, by looking through the small apertures, may see objects in their natural colors, but the semi-transparent material surrounding the apertures will effectively cut off glaring rays from other objects, so that the wearer thus has a great deal of the glare reduced.

Another object of the invention is to provide an improved glare shield in the form of a pair of spectacles having two pairs of lenses, each of which pairs of lenses is formed of semi-transparent material, and one of which pairs has the apertures as above outlined, so that one pair of lenses can be employed, having the apertures, when glaring conditions are not extremely strong and the other pair of lenses may be employed under more uncomfortable conditions.

Another object of the invention is to provide a glare shield having two pairs of lenses, each of which is formed of semi-transparent material and can be used either simultaneously or separately for the purpose hereinafter to be described.

Another object of the invention is to provide an improved glare shield in the form of a pair of lenses, formed of semi-transparent material, which can be easily and quickly applied to or detached from the frame of a pair of spectacles.

With the foregoing and other objects in view, which will be made manifest in the following detailed description and specifically pointed out in the appended claim, reference is had to the accompanying drawings for an illustrative embodiment of the invention, wherein:

Figure 1 is a view in front elevation of one form of the improved glare shield.

Fig. 2 is a vertical section taken substantially upon the line 2—2 upon Fig. 1.

Fig. 3 is a view in front elevation of a glare shield of slightly modified construction.

Fig. 4 is a vertical section taken substantially upon the line 4—4 upon Fig. 3.

Fig. 5 is a perspective view of a pair of spectacles, to which glare shields of another form have been applied.

Fig. 6 is a perspective view of one of the glare shields disclosed in Fig. 5.

Referring to the accompanying drawings, wherein similar reference characters designate similar parts throughout, the improved glare shield in the modification disclosed in Figures 1 and 2 consists of a spectacle frame of the conventional construction, having a nose piece, 10, connecting two lens frames, 11 and 12, on the sides of which are pieces or temples, 13, and vertically mounted. At the top of the spectacle frame, there are two lenses, 14 and 15, which are formed of semi-transparent material, such as, for example, colored celluloid. These lenses are fastened to the spectacle frame by U-shaped clasps, 16, which encircle the upper portions of the lens frames, 11 and 12, and have their ends embracing and fastened to the tops of the lenses. These U-shaped clasps serve to pivotally mount the lenses 14 and 15 to the tops of the lens frames, 11 and 12. They are preferably so constructed, however, that they bear against the top of the lens frame with sufficient force so that quite a little friction will be present, thus enabling the lenses to be pivotally moved, but at the same time to be frictionally held in adjusted position.

A corresponding pair of lenses, 17 and 18, are connected to the bottom portions of the lens frames, 11 and 12, by corresponding U-shaped clasps, 19, which encircle the bottom portions of the lens frames and have their ends embracing and fastened to the bottom portions of the lenses. These lenses have relatively small circular apertures, 20, formed in their centers so that they will be arranged approximately horizontally even with the eyes of the wearer. The clasps 19 are similar in construction to the clasps 16, and while they will permit the lenses 17 and 18 to pivot on the lower portions of the lens frames, they will hold these lenses in adjusted position.

The operation and utility of the glare shield is as follows: Under conditions wherein there is only a medium amount of glare, the lenses 17 and 18 are swung upwardly and occupy positions in the lens frames. When in this position, the lenses 14 and 15 occupy the positions shown. The wearer can look through the apertures, 20, and see objects therethrough in their natural color, but excess glaring rays from surrounding objects are effectively cut off by the semi-transparent material forming the lenses 17 and 18 about the apertures. Under more glaring conditions, it is possible to swing the lenses 17 and 18 out of the lens frames and into an outwardly and downwardly extending position. The lenses, 14 and 15, can then be caused to occupy the lens frames, in which position all of the light reaching the eyes of the wearer must first pass through semi-transparent material, which will cut off glaring rays.

The modification shown in Figures 3 and 4 is similar in construction, consisting of a spectacle frame, 21, having two pairs of lenses, the lenses of one pair being indicated at 22 and the lenses of the other pair being indicated at 23.

The lenses 22 correspond to the lenses 14 and 15, being formed of semi-transparent material and being unperforated.

The lenses 23 correspond to the lenses 17 and 18 and have the apertures, 24, formed therein.

The clasps or mounting devices, 25, which mount the lenses, 23, on the spectacle frame, 21, are identical in construction to the clasps 19. The clasps 26, which fasten the lenses, 22, to the spectacle frame, however, are bent as shown in Figure 4, forming an offset so that the lenses, 22, can occupy positions forwardly of the lenses, 23, while the lenses, 23, are in the lens frames. This enables both pairs of lenses to be simultaneously employed, which is not possible in the modification shown in Figures 1 and 2. When either pair of lenses, 22 or 23, is used alone, the advantages present in the modification shown in Figures 1 and 2 are developed. When the lenses, 22 and 23, are simultaneously employed, as shown in Figure 4, all of the light reaching the eyes of the wearer must pass through at least one thickness of semi-transparent material, namely, that portion of each lens, 22, which is over an aperture, 24. The light which does not pass through the aperture, 24, must pass through two thicknesses of semi-transparent material, so that the modification disclosed in Figures 3 and 4 is adapted to be used under three different conditions, namely, where the glare present is not very bad, in which case the lenses, 23, alone are used; if the glare is stronger, the lenses, 22, can be used alone; and if the glare is extremely bad, both lenses can be used simultaneously.

In Figures 5 and 6, a modified form of construction is disclosed, adapted to be employed by persons who normally wear spectacles. This modification consists of a rectangular sheet of transparent material, 27, having its ends bent over rearwardly and toward each other, forming hooks 28 at the top and bottom of the section, adapted to engage the lens frames of a spectacle frame, 29. These lenses provided in this manner can be slipped laterally on to or off of the lens frames. They may be provided with apertures, 30, enabling the lenses to be used under conditions where glare is only slight; or the lenses may be left unperforated, so that they will be designed for use under more glaring conditions.

From the above described construction, it will be appreciated that an improved form of glare shield is provided which simulates a pair of spectacles but which provides for adjustment so that the glare shield can adequately relieve the eyes of the wearer under different glaring conditions.

Various changes may be made in the details of construction without departing from the spirit or scope of the invention as defined by the appended claim.

I claim:

A glare shield comprising a spectacle frame, a pair of lenses formed of semi-transparent material, pivotally mounted upon the tops of the lens frames of the spectacle frame, adapted to assume positions over the lens frames, and a second pair of lenses formed of semi-transparent material, pivotally mounted upon the bottoms of the lens frames, adapted to assume positions over the lens frames, one of the pairs of lenses having apertures formed centrally thereof.

In testimony whereof I have signed my name to this specification.

CHARLES I. WALKER.